W. E. SWIFT.
INCUBATOR.
APPLICATION FILED MAY 24, 1915.

1,232,868.                               Patented July 10, 1917.

Inventor
W. E. Swift,

UNITED STATES PATENT OFFICE.

WILLIAM E. SWIFT, OF WAVERLY, ILLINOIS.

INCUBATOR.

1,232,868. Specification of Letters Patent. Patented July 10, 1917.

Application filed May 24, 1915. Serial No. 30,181.

*To all whom it may concern:*

Be it known that I, WILLIAM E. SWIFT, a citizen of the United States, residing at Waverly, in the county of Morgan and State of Illinois, have invented certain new and useful Improvements in Incubators; and I do hereby declare the following to be a full, clear, and exact description of the invention, such as will enable others skilled in the art to which it appertains to make and use the same.

This invention is an improved incubator embodying an incubating or egg chamber which is arranged in a hot water tank, and provided with ventilating means, and a box or case in which the hot water tank is inclosed and which provides insulation for the tank to minimize the loss of heat from the tank and hence enable the incubator to be kept in operation with but very slight and infrequent attention, another object being to provide an improved incubator of this class which is extremely cheap and simple, is durable and which can be operated at very small cost.

The invention consists in the construction, combination and arrangement of devices hereinafter described and claimed.

In the accompanying drawings:—

Figure 1:
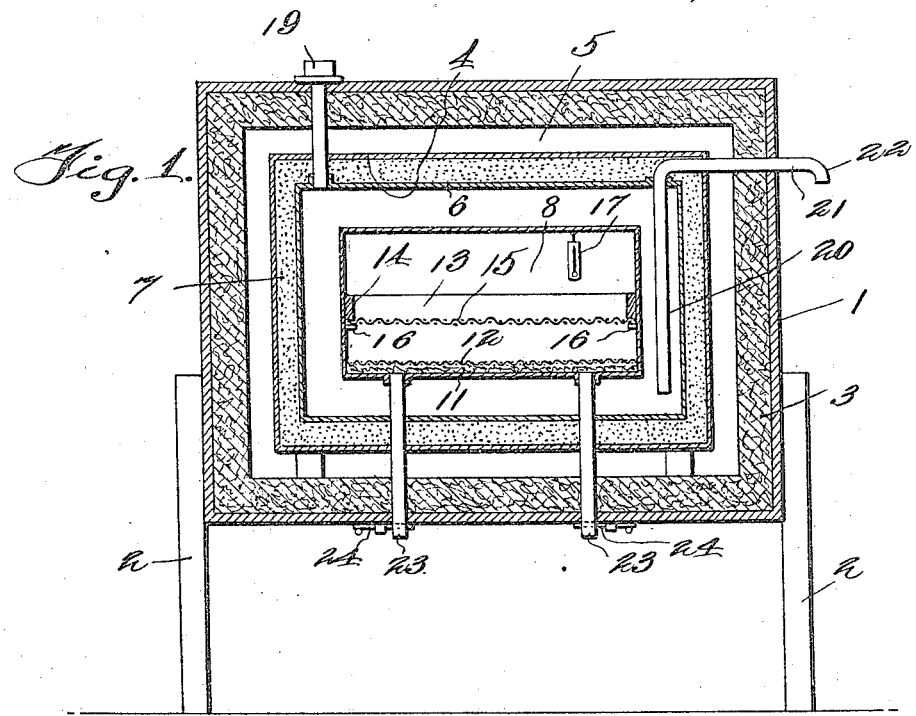
Figure 1 is a vertical central sectional view of an incubator constructed in accordance with my invention.
Figure 2:
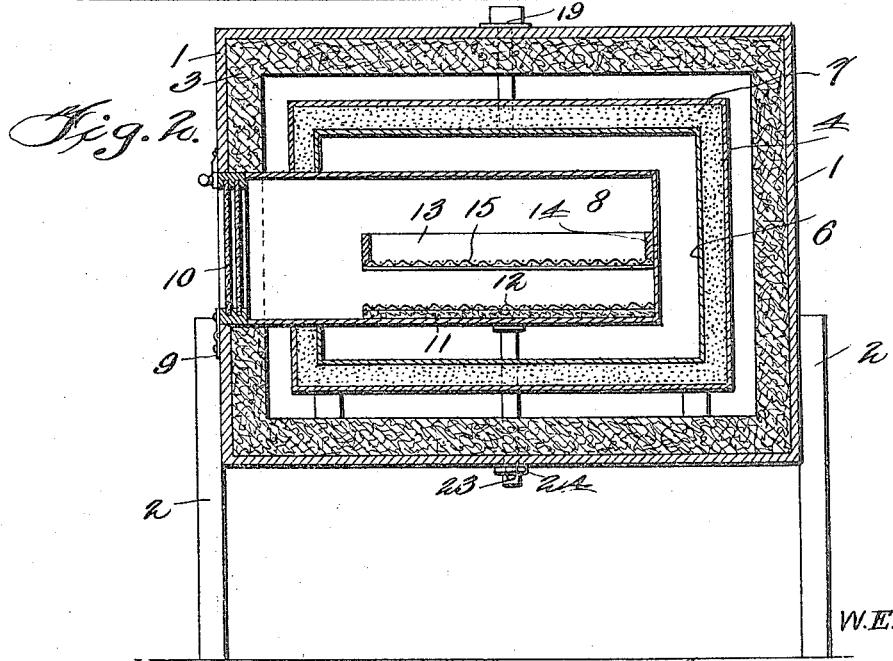
Fig. 2 is a similar view on a plane at right angles to that of Fig. 1.

In the embodiment of my invention I provide a box or casing 1, which may be of any suitable size and shape and may be made of any suitable material. Legs 2 are provided for the casing and the casing is provided with a lining 3 of suitable thickness in its walls and top and bottom, which lining is preferably made of asbestos but may be made of any other suitable material. An insulating tank 4 which may be made of any suitable material and which corresponds in shape with, but is smaller than the outer casing is arranged in the chamber 5 formed within the outer casing and is spaced from the walls and top and bottom of the outer casing so that a dead air space is formed between the nonconducting lining 3 and the said insulating tank. A hot water tank 6, which is preferably made of galvanized iron, but which may be made of any suitable material, is arranged in and spaced from the walls of the insulating tank 4, the space between the walls of the insulating tank and those of the hot water tank being filled with suitable insulating material 7 such for instance sawdust.

The egg chamber or incubating chamber 8 is arranged in and spaced from the walls of the hot water tank and is also extended as at 9 through the front wall of the outer casing and correspondingly through the front walls of the hot water tank and the insulating tank and is provided, at its outer end, with a hinged double glazed door 10, which enables access to be had to the incubating chamber and also enables its contents to be inspected from time to time as desired. On the bottom wall of the incubating chamber is a mat 11, of felt or the like, on which is placed a burlap or other suitable cover 12, to protect the mat from dirt. An egg tray 13 which comprises a wooden frame 14 and a wire mesh bottom 15 is placed in the incubating chamber and supported on flanges 16 a suitable distance from the bottom of said chamber. A thermometer 17, arranged in the chamber, hangs on a wire which is soldered or otherwise suitably secured to the top of said chamber 8.

In practice the top of the tank in front is somewhat higher than the back to enable the tank to be filled without leaving an air space therein. A filling pipe 18 is provided for the hot water tank, extends through the top of the box or outer casing and is provided at its upper end with a suitable filling cap 19. An overflow pipe 20 leads from a point near the bottom of the hot water tank and has an upper horizontal outwardly extending arm 21 provided at its outer end with a discharge elbow 22.

Ventilating pipes 23 extend through the bottoms of the outer casing, insulating tank and hot water tank and are connected to the bottom of the egg or incubating chamber and communicate therewith and are provided at their lower ends with slides or valves 24 to regulate the passage of air to and from the incubating chamber.

In the operation of my improved incubator the hot water tank is kept filled with hot water. Ordinarily in an incubator of ordinary size in which the incubating chamber and egg tray are large enough for one hundred eggs, the hot water tank requires to be filled with hot water once every twelve hours and hence but very little attention is required to keep the incubator in operation.

As the chicks hatch they drop on the burlap covering in the bottom of the incubator chamber and may be removed when desired through the door 10.

I would have it understood that the incubator may be constructed of any suitable material and may be of any suitable size and shape, according to the desired capacity thereof. I would also have it understood that changes may be made in the form, proportion and construction of the several parts without departing from the spirit of the invention and within the scope of the appended claim.

Having thus described my invention, I claim:—

An incubator of the class described comprising an outer casing, means for supporting the outer casing, said outer casing having an insulating lining, an insulating tank located within the outer casing and spaced from the lining thereof so as to provide a dead air space between the insulating tank and the outer casing, a hot water tank arranged in said insulating tank and spaced from the walls thereof, insulating material packed between the insulating tank and the walls of the hot water tank, an incubating chamber arranged centrally in the hot water tank and extended out through one wall of the hot water tank, insulating tank and outer casing, and a suitable closure secured to the incubator chamber, an overflow pipe for said tank, means for filling said hot water tank, and a plurality of ventilating pipes extended through the bottom walls of the insulating tank and outer casing having their inner ends connected to the incubator chamber and communicating therewith, said ventilating pipes supporting the incubator chamber within the hot water tank, and a mat arranged over the bottom wall of the incubator chamber and the ends of the ventilating pipe thus preventing a direct draft upon the contents of the incubator chamber.

In testimony whereof I affix my signature in presence of two witnesses.

WILLIAM E. SWIFT.

Witnesses:
CHARLES A. CARTER,
DELOS B. STULTS.

Copies of this patent may be obtained for five cents each, by addressing the "Commissioner of Patents, Washington, D. C."